United States Patent [19]

Lisowyj et al.

[11] Patent Number: 4,757,770
[45] Date of Patent: Jul. 19, 1988

[54] CONDENSATE SAND COLLECTION SYSTEM

[75] Inventors: Bohdan Lisowyj, Omaha, Nebr.; David Hitchcock, Independence, Mo.; Henry Epstein, Omaha, Nebr.

[73] Assignee: Enron, Inc., Houston, Tex.

[21] Appl. No.: 85,617

[22] Filed: Aug. 13, 1987

Related U.S. Application Data

[62] Division of Ser. No. 582,483, Jul. 7, 1986, abandoned.

[51] Int. Cl.⁴ .................................................. F23J 3/00
[52] U.S. Cl. ..................................... 110/216; 432/217; 432/72
[58] Field of Search ............... 110/216, 217, 344, 345; 432/72

[56] References Cited

U.S. PATENT DOCUMENTS

| | | | |
|---|---|---|---|
| 3,635,440 | 4/1972 | Grey | 110/216 |
| 3,745,939 | 7/1973 | Allbritton | 110/216 |
| 4,245,571 | 1/1981 | Przewalski | 110/216 |
| 4,289,730 | 9/1981 | Tomlinson | 110/216 |
| 4,357,152 | 11/1982 | Duske et al. | 110/216 |
| 4,532,871 | 8/1985 | Van Gasselt et al. | 110/216 |
| 4,568,273 | 2/1986 | Narumiya | 110/217 |
| 4,579,069 | 4/1986 | Gay et al. | 110/216 |

*Primary Examiner*—Henry C. Yuen
*Attorney, Agent, or Firm*—Zarley, McKee, Thomte, Voorhees & Sease

[57] ABSTRACT

A sand collection system includes a column of coarse sand within a cylindrical container coaxially mounted to the output end of a furnace conduit through which heated gases containing sublimate will pass. A layer of gas permeable material holds sand in position and an aperture in its center assists in directing gases generally to the center of the sand column. The sand column is spaced away from the furnace a distance such that the temperature differential will cause condensation of the heated gases on the surfaces of the sand particles.

1 Claim, 1 Drawing Sheet

CONDENSATE SAND COLLECTION SYSTEM

CROSS REFERENCE TO RELATED APPLICATION

This application is a divisional of Ser. No. 882,483, filed July 7, 1986 and entitled "Sand Collection System", now abandoned.

TECHNICAL FIELD

The present invention relates generally to systems used in recovering trace minerals from fly ash.

BACKGROUND OF THE INVENTION

In the process of recovering certain trace metals present in fly ash from the combustion of coal, the fly ash is first treated in the presence of an oxidizing gas. Then the oxides are treated in the presence of a reducing gas to reduce the oxides to suboxides, which are volatile and consequently will sublime. Two valuable trace metals present in such fly ash are gallium and/or germanium. As described, these materials will sublime when reduced to their suboxides. The gaseous suboxides carried by the reducing gas are then caused to condense in order to remove the sublimate products from the reducing gas.

One method of removing the sublimation products, is to scrub the reducing gas with a cold liquid solution which will dissolve the suboxides. The solution is then evaporated to obtain the trace metals. Another method is to condense the suboxides on a cool surface, such as a "cold finger". A cold finger is an air-cooled probe which is introduced into the heated gaseous vapors. The cool exterior surface causes the suboxides to condense thereon, the reducing gas passing by the condenser after having "released" the suboxides. The condensation is then collected from the cooled surface and may be subjected to further processing.

However, air-cooled condensers have proved inefficient in the recovery of trace metal, such as germanium, which is very volatile when subjected to a reducing atmosphere. Nor have scrubbers provided an adequate solution.

It is therefore an object of the present invention to provide an improved collection system for the recovery of trace metals from fly ash.

Another object is to provide a collection system which operates efficiently without utilizing any coolant.

Yet another object of the invention is to provide a collection system which will efficiently recover sublimate products from volatile gases.

Another object of the invention present invention is to provide a collection system which is simple in operation and economical to manufacture.

SUMMARY OF THE INVENTION

A sand collection system is disclosed which includes a column of coarse sand within a cylindrical container coaxially mounted to the output end of a furnace conduit through which heated gases containing sublimate will pass. A layer of gas permeable material holds sand in position and an aperture in its center assists in directing gases generally to the center of the sand column. The sand column is spaced away from the furnace a distance such that the temperature differential will cause condensation of the heated gases on the surfaces of the sand particles.

DESCRIPTION OF THE PREFERRED EMBODIMENT

Figure 1:
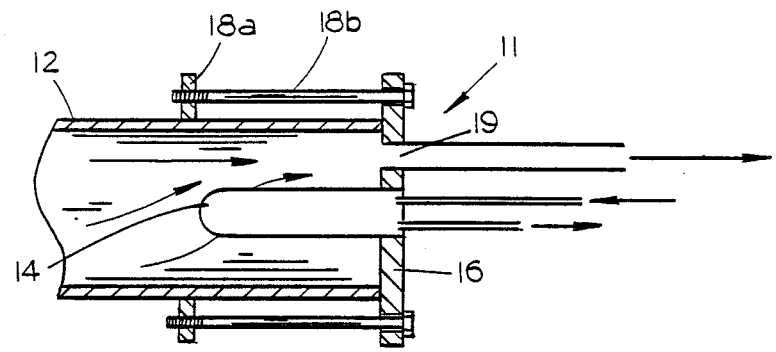
FIG. 1 is a cross-sectional view of a prior art air-cooled condenser installed in a conduit from a furnace.

Referring now to the drawings, a conventional prior art condenser, commonly known as a "cold finger", is indicated generally at 11 in FIG. 1, and is removably mounted in a gas outlet conduit 12 from a furnace (not shown). The condenser 11 includes a hollow tube portion 14, closed at both ends, and mounted generally co-axial with the axis of the conduit 12, the tube portion 14 having a diameter less than that of conduit 12 such that gases may surround and pass by tube portion 14 within conduit 12. Tube portion 14 is mounted in a plug 16 which closes the output end of conduit 12. Condenser 11 is removably mounted in conduit 12 using a clamp ring 18a and bolts 18b in a manner conventional in the art.

As heated gas passes from conduit 12 through an exit port 19 adjacent to tube 14, the cold exterior surface of tube 14 causes sublimated products in the gas to condense. The carrier gas continues on through exit port 19 for later use. Once tube 14 becomes covered with condensate it is removed from conduit 12 by removing bolts 18b from clamp ring 18a, thereby releasing plug 16 from conduit 12. The condensate is then removed from tube 14 using a dissolving wash or the like. Tube 14 may then be replaced in conduit 12 for reuse.

Since some fly ash pellets are composed of materials which fuse at lower temperatures than are efficient for purposes of an air-cooled condenser, a radically different approach to recovery of the sublimate product has been taken. The germanium suboxides produced in the reducing atmosphere from such fly ash are highly volatile, and thus, do not easily give up their sublimate products.

The inventors have therefore presented a condenser with a very large surface-to-volume ratio, so that volatile gases must pass over a great amount of surface within a generally short linear distance. Thus, the volatile gases have a greatly increased chance of giving up their sublimate products to a surface of the appropriate temperature.

Figure 2:
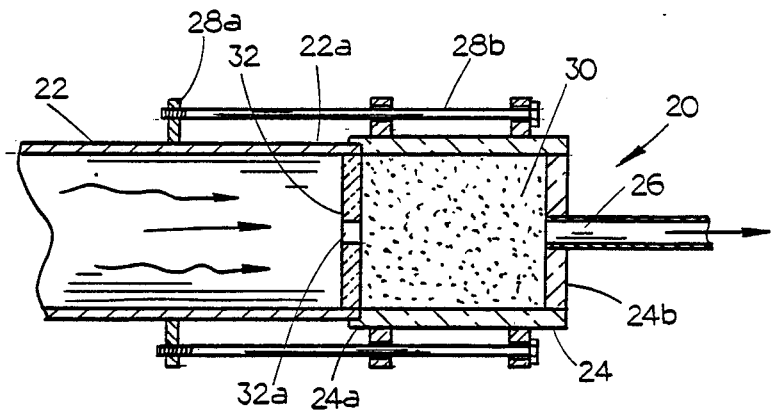
FIG. 2 is a cross-sectional view of the present invention installed in a conduit from a furnace.

Referring now to FIG. 2, one embodiment of the collection system, designated generally at 20, is mounted to the output end 22a of a furnace exhaust gas conduit 22. Collection system 20 includes a hollow cylindrical container 24 open at one end 24a and having a restricted opening 26 in the other end 24b. The container 24 is removably mounted with its open end 24a connected to conduit output end 22a so that heated gases containing sublimate will pass into the container 24 and exit through opening 26. Container 24 is removably mounted using a clamp ring 28a and bolts 28b in a manner conventional in the art.

Container 24 is filled with a coarse grade of particulate material 30, which affords a very large surface-to-volume ratio. As noted above, this large surface-to-volume ratio is especially suited to volatile gases. In the instant case, sand was utilized as the particulate material 30. Because of the inexpensive materials which may be utilized, the invention will function much more economically than an air-cooled condenser.

Sand 30 is held in place within container 24 by a layer of gas permeable material 32 mounted across open end 24a of container 24. An aperture 32a near the center the material 32 serves to increase the gas flow through the center of the sand 30, thereby allowing the gases to percolate through the sand more uniformly. Because of the large surface-to volume ratio, the gas will travel past a large surface area before it escapes through opening 26. For this reason, the volatile gases will have a greatly increased chance of giving up their sublimate products to a specific surface of the appropriate temperature at the appropriate time.

As the sand 30 becomes saturated with condensate, the container 24 is removed from conduit 22 by releasing bolts 28b from clamp ring 28a. The material layer 32a is removed from container 24 and the sand 30 may be removed from container 24 and washed in a dilute acid to remove the sublimate products. The sand 30 may then be replaced in the container and reused to collect more sublimate products.

In operation, sand collection system 20 would be positioned an effective distance from the hot zone of the furnace. Obviously, this distance will vary in relation to the rate at which the gases within conduit 22 dissipate heat. These parameters are based such factors as the materials utilized in the conduit, operating temperature, etc., and are easily determined by known methods. For purposes of the embodiment of FIG. 2, it is assumed that this effective distance has been predetermined and that the furnace would be continuously operated within a narrow range of temperatures, such that it would be unnecessary to change this effective distance. Alternatively, conduit 22 could be made removable from the furnace and replaced with varying lengths, such that a variety of effective distances may be obtained.

Figure 3:
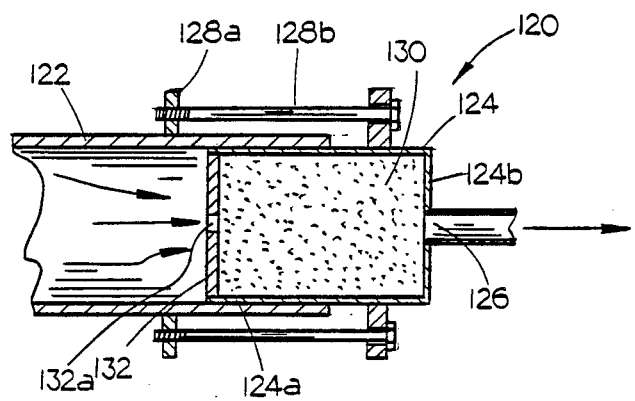
FIG. 3 is a cross-sectional view of another embodiment of the invention installed in a conduit from a furnace.

Referring now to FIG. 3, another embodiment of the invention is disclosed, which is merely adapted to slide within conduit 22, rather than being mounted on its end. Because container 24 may be selectively mounted in varying positions within conduit 22, the effective distance to the hot zone of the furnace may also be varied. Thus, in this embodiment, the furnace may be operated at different temperatures with the container 24 being adjusted in response thereto. Since all of the parts of the embodiment of FIG. 3 functionally correspond to the parts of the embodiment of FIG. 2, they have been numbered with corresponding numbers in the 100 series. The major difference between the two embodiments is that the diameter of container 124 in FIG. 3 is slightly less, such that it will slide within the interior of conduit 122.

With any of the disclosed embodiments, it is desirable to locate the forward end 24a of container 24 at a distance which corresponds to a temperature slightly higher than that which will cause condensation, so that condensation will not occur in material 32. In this way, condensation will begin immediately adjacent material 32 within sand 30. In any event, such parameters are easily determined by known methods.

It can therefore be seen that the above disclosed device fulfills at least all of the objectives of this invention.

We claim:

1. In combination with a furnace, the furnace having an output conduit with a generally cylindrical output end and a furnace-connected end, a sand collection system for recovering sublimate products from volatile gases produced by the furnace, comprising:

said furnace having a hot zone and producing volatile gases having gaseous sublimate products therein;

a generally cylindrical hollow container having open opposite first and second ends;

means on said container for removably mounting said container at least partially within said furnace conduit;

said container having an outside diameter approximately equal to the inside diameter of said conduit, and adapted to form a tight, slidable fit between said container and said conduit;

seal means mounted between the exterior wall of said container and the interior wall of said furnace conduit, adapted to form an airtight seal between said container and said conduit;

said container being filled with removable coarse particulate material;

said container being positioned with said conduit a distance from the hot zone of said furnace such that the volatile gases from said furnace will condense on the surfaces of said particulate material and leave sublimate products on said particulate material;

a fluid-permeable material removably mounted in said first end of said container and adapted to hold said particulate material within said container; and a wall in said second end of said container having a restricted opening therein for holding said particulate material within said container, and adapted to allow the flow of fluid therethrough.

* * * * *